(12) United States Patent
Hsiao et al.

(10) Patent No.: US 10,223,727 B2
(45) Date of Patent: Mar. 5, 2019

(54) E-COMMERCE RECOMMENDATION SYSTEM AND METHOD

(71) Applicant: OATH INC., New York, NY (US)

(72) Inventors: Jen-Hao Hsiao, Taipei (TW); Nan Liu, Sunnyvale, CA (US); Jia Li, Santa Clara, CA (US)

(73) Assignee: OATH INC., New York, NY (US)

( * ) Notice: Subject to any disclaimer, the term of this patent is extended or adjusted under 35 U.S.C. 154(b) by 662 days.

(21) Appl. No.: 14/518,431

(22) Filed: Oct. 20, 2014

(65) Prior Publication Data
US 2016/0110794 A1 Apr. 21, 2016

(51) Int. Cl.
G06Q 30/00 (2012.01)
G06Q 30/06 (2012.01)
G06K 9/62 (2006.01)

(52) U.S. Cl.
CPC ....... *G06Q 30/0631* (2013.01); *G06K 9/6256* (2013.01)

(58) Field of Classification Search
None
See application file for complete search history.

(56) References Cited

U.S. PATENT DOCUMENTS

| | | | | |
|---|---|---|---|---|
| 7,961,986 B1* | 6/2011 | Jing | ................ | G06F 17/30265 382/305 |
| 8,429,173 B1* | 4/2013 | Rosenberg | ........ | G06F 17/30247 707/748 |
| 2011/0188742 A1* | 8/2011 | Yu | ........................ | G06K 9/6218 382/159 |
| 2012/0158638 A1* | 6/2012 | Churchill | ............... | G06Q 10/00 706/52 |
| 2013/0346182 A1* | 12/2013 | Cheng | ................ | G06Q 30/0242 705/14.41 |
| 2014/0032359 A1* | 1/2014 | Dewangan | ......... | G06Q 30/0631 705/26.7 |
| 2014/0108316 A1* | 4/2014 | Goldman | ............... | G06Q 50/01 706/46 |
| 2014/0136332 A1* | 5/2014 | Amit | ................... | G06Q 30/0269 705/14.66 |
| 2015/0036919 A1* | 2/2015 | Bourdev | .............. | G06K 9/6256 382/156 |

(Continued)

OTHER PUBLICATIONS

Fabiano M. Belém et al; "Personalized and object-centered tag recommendation methods for Web 2.0 applications"; Apr. 10, 2014; Department of Computer Science, Universidade Federal de Minas Gerais, Brazil; Information Processing and Management 50 (2014) 524-553 (Year: 2014).*

*Primary Examiner* — Naeem U Haq
*Assistant Examiner* — Norman Donald Sutch, Jr.
(74) *Attorney, Agent, or Firm* — James J. DeCarlo; Greenberg Traurig, LLP

(57) ABSTRACT

Disclosed herein is item recommender that uses a model trained using a combination of at least visual item similarity training data and social activity training data. The model may be used, for example, to identify a set of recommended products having similar visual features as a given product. The set of recommended products may be presented to the user along with the given product. The model may be continuously updated using feedback from users to identify the features considered to be important to the users relative to other features.

21 Claims, 9 Drawing Sheets

(56) References Cited

U.S. PATENT DOCUMENTS

| | | | |
|---|---|---|---|
| 2015/0095185 A1* | 4/2015 | Katukuri | G06Q 30/0631 705/26.7 |
| 2015/0169759 A1* | 6/2015 | Ronen | G06F 17/30864 707/706 |
| 2015/0178786 A1* | 6/2015 | Claessens | G06Q 30/0269 705/14.66 |

* cited by examiner

E-COMMERCE RECOMMENDATION SYSTEM AND METHOD

FIELD OF THE DISCLOSURE

The present disclosure relates to e-commerce product recommendation, and more particularly to using visual appearance and observed social activity, or patterns, associated with visual images of products.

BACKGROUND

Electronic commerce, or e-commerce, typically includes at least one e-commerce provider with items that the provider(s) would like to sell to buyers online using the Internet and/or other networks. There are an enormous number of items available online, and a user may be presented with a great number of items, which the user may peruse and may ultimately decide to purchase.

SUMMARY

An important aspect of e-commerce is providing an online user with item, e.g., product, alternative(s) relevant to the user. In so doing, the user is able to find the product(s) that the user is seeking, and the user is more likely to purchase the product(s). If the product recommendations are not relevant to the user, the user is likely to become frustrated with the experience and/or will not make any purchases. Similarly, it is beneficial for an e-commerce provider to be able to identify and promote product(s) that are relevant to each user; however, the provider may easily be overwhelmed by the amount of data collected about users thereby making it difficult for the provider to use the data to identify and promote the appropriate products to a user. Thus, it is important to be able to identify one or more products relevant to the e-commerce user.

The present disclosure seeks to address failings in the art and to provide a recommender that uses a model trained using a blend of visual similarity and social activity training data determined for a set of items. The social activity training data may take into account, for each item, correlations with one or more other items identified using user behavior, e.g., observed user behavior. By way of some non-limiting example, such user behavior may indicate shared user interest in two or more items, which shared user interest may be used to correlate, or relate, the items. Such shared user interest in two or more items may be identified using observed co-view, co-favorite, co-purchase, etc. user behavior, for example. By way of a further non-limiting example, items 1 and 2 may be related based on shared user interest identified from data indicating that one or more users that viewed item 1 also viewed item 2. Similarly, items may be related based on shared user interest identified based on co-purchase, co-favorite, etc. user behavior. Visual similarity training data may comprise information identifying, for each item, a level of similarity between each other item in the training data. Visual similarity may be determined using visual features of each item identified using an image of each item. Visual similarity and social activity training data may be used to train the model, which model may be used to make item recommendations. A machine learning component used to generate the model may be multimodal in that it trains the model using a number of different types of information, such as and without limitation visual similarity, social activity, item metadata information, etc. A model trained using a multimodal model trainer may be used to generate a set of recommendations comprising one or more items; the model may also be used to rank the items in the recommendation set. In accordance with one or more embodiments, user click data may be provided as input to the model generation and may be used to determine a level of importance of each features, e.g., which features are considered important to the user, and such a determination may be used in training the model.

In accordance with one or more embodiments, a method is provided, the method comprising determining, by at least one computing device, visual similarity training data for a plurality of items, the visual similarity training data identifying, for each pair of items of the plurality of items, a level of visual similarity between images of the items in the pair; determining, by the at least one computing device, social activity training data for the plurality of items, the social activity training data identifying, for each pair of items of the plurality of items, an indicator of whether a shared user interest in the pair of items exists; training, by the at least one computing device, a model using a training data comprising the image similarity training data and the social activity training data; and generating, by the at least one computing device, a set of recommended items using the trained model.

In accordance with one or more embodiments a system is provided, the system comprising at least one computing device, each computing device comprising a processor and a storage medium for tangibly storing thereon program logic for execution by the processor, the stored program logic comprising first determining logic for determining visual similarity training data for a plurality of items, the visual similarity training data identifying, for each pair of items of the plurality of items, a level of visual similarity between images of the items in the pair; second determining logic for determining social activity training data for the plurality of items, the social activity training data identifying, for each pair of items of the plurality of items, an indicator of whether a shared user interest in the pair of items exists; training logic for training a model using a training data comprising the image similarity training data and the social activity training data; and generating logic for generating, using the trained model, a set of recommended items.

In accordance with yet another aspect of the disclosure, a computer readable non-transitory storage medium is provided, the medium for tangibly storing thereon computer readable instructions that when executed cause at least one processor to determine visual similarity training data for a plurality of items, the visual similarity training data identifying, for each pair of items of the plurality of items, a level of visual similarity between images of the items in the pair; determine social activity training data for the plurality of items, the social activity training data identifying, for each pair of items of the plurality of items, an indicator of whether a shared user interest in the pair of items exists; train a model using a training data comprising the image similarity training data and the social activity training data; and generate a set of recommended items using the trained model.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an overview of a system for use in accordance with one or more embodiments of the present disclosure.

FIG. 2 illustrates components for use in accordance with one or more embodiments of the present disclosure.

FIG. 3 provides a process flow example for use in accordance with one or more embodiments of the present disclosure.

FIG. 4 provides another process flow example for use in accordance with one or more embodiments of the present disclosure.

FIG. 5 provides an example of an extraction of a product from an image that includes a model in accordance with one or more embodiments of the present disclosure.

FIG. 6 provides an example of product image extraction using an image mask in accordance with one or more embodiments of the present disclosure.

FIG. 7 provides examples of product recommendations identified for a given product, a seed product.

DETAILED DESCRIPTION

Figure 1:
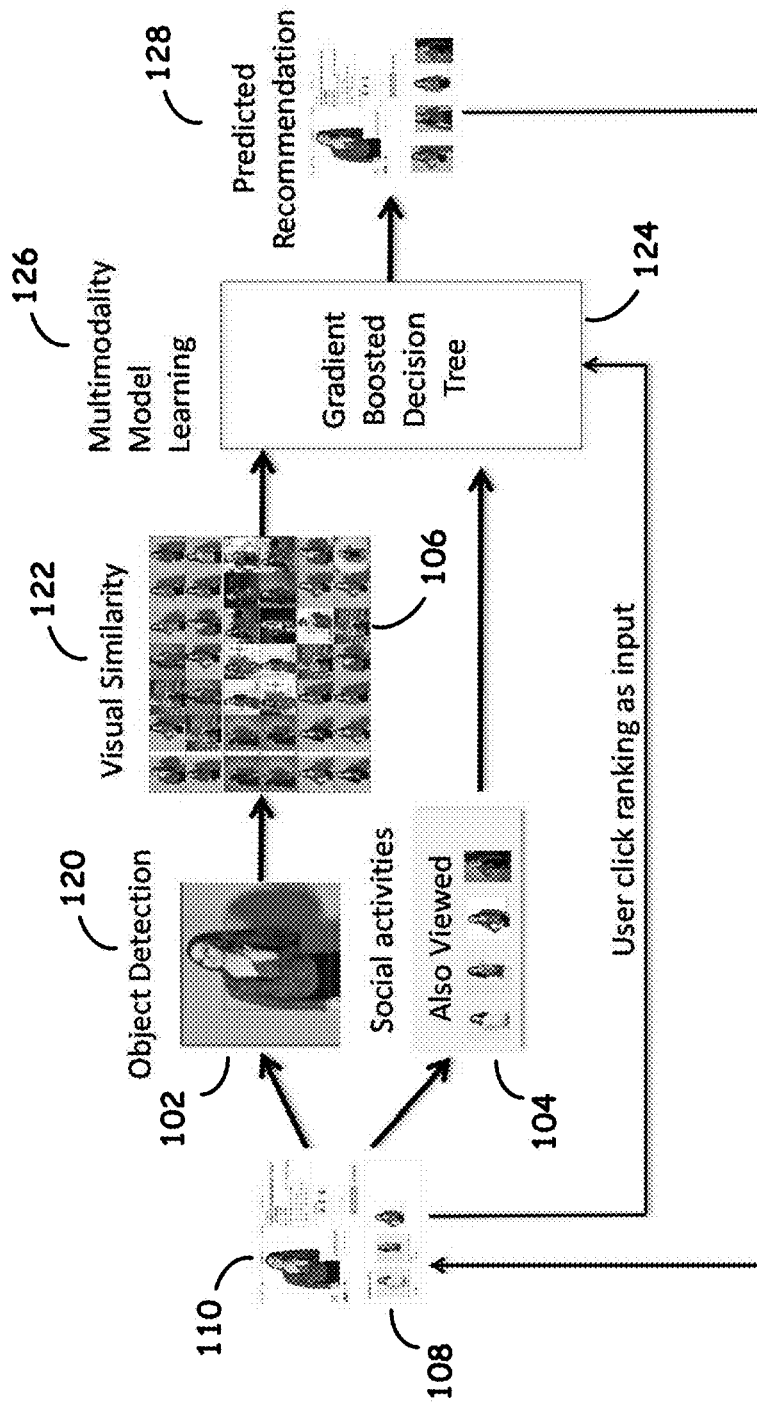

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In general, the present disclosure includes an electronic, or e-commerce, recommendation system, method and architecture. One or more embodiments are discussed herein in connection with an e-commerce recommender recommending products. It should be apparent that embodiments discussed herein are not limited to products and may be used to recommend any type of item, including services. Other non-limiting examples of items that may be recommended include, without limitation content, such as audio, video, multimedia digital data.

FIG. 1 provides an overview of a system for use in accordance with one or more embodiments of the present disclosure. Components 120, 122, 126 and 128 may be implemented by one or more computing devices.

In the example shown in FIG. 1, a recommender in accordance with one or more embodiments may be used to generate a set of recommendations for display in a web page, e.g., web page 110 shown in FIG. 1. The web page 110 may be provided for presentation to a user and may display an image 102 of a product, together with the image(s) 108 of one or more other products 104. The other products may include products that are related based on shared user interest, such as and without limitation products that have been co-viewed, co-purchased, co-favorites, etc. by the user. In accordance with one or more embodiments, the other products may comprise products belonging to a set of recommendations identified by a recommendation component, or recommender, 128 using a model, such as model 124.

Model 124 may be learned, or trained, using a blend of visual similarity and social activity training data determined for a set of products. The social activity training data may take into account, for each product, correlations with one or more other products identified using user behavior, e.g., observed user behavior. By way of some non-limiting example, such user behavior may indicate shared user interest in two or more products, which shared user interest may be used to correlate, or relate, the products. Such shared user interest in two or more products may be identified using observed co-view, co-favorite, co-purchase, etc. user behavior, for example. By way of a further non-limiting example, two or more products may be related based on shared user interest identified from data indicating that one or more users that viewed one of the products also viewed the other product(s). Similarly, products may be related based on shared user interest identified based on co-purchase, co-favorite, etc. user behavior.

Visual similarity training data may comprise information identifying, for each product, a level of similarity between each other product in the training data. Visual similarity may be determined using visual features of each product identified using an image of each product. Visual similarity and social activity training data may be used to train the model, which model may be used to make item recommendations.

A machine learning component, such as model learning component 126, used to generate a model, e.g., model 124, may be multimodal in that it trains the model using a number of different types, or sources, of information, such as and without limitation visual similarity, social activity, item metadata information, user events, e.g., user click, user skips, etc. which user events may be considered to be implicit user preference or feedback regarding the model 124.

In accordance with one or more embodiments of the present disclosure, one or more gradient boosted decision trees may be trained as model 124, e.g., a regression model, upon various types, or sources, of information, such as and without limitation visual similarity, social activity, item metadata information, user events, e.g., user clicks, user skips, etc. Item rankings may be learned automatically from user events, such as and without limitation clicks, skips, etc. of the item(s) included in a set of recommendations. Such user events may comprise implicit user preference. Item ranks, e.g., ranking of items in connection with a recommendation set, may be based on a ranking prediction generated using model 124 learned using model learning component 126. The model 124 may generate new rankings, which may be used to refresh a recommendation set and may be used as input for retraining and making improvements to the model 124 to accurately reflect user preferences in connection with items and item characteristics, which may be dynamically changing in the e-commerce domain.

Beneficially and in accordance with at least one embodiment, model learning component 126 may adapt the model 124 to reflect changes in the items and item characteristics. The model learning component 126 may receive multiple types or sources of input that may be dynamically-changing, such as and without limitation a dynamically-changing set, or pool, of items and item characteristics. The model learning component 126 may refresh the model 124 frequently, e.g., at a pace that reflects the rapidity of changes to the input.

In accordance with one or more embodiments, operation may alternate among training of the model 124, adapting parameters, e.g., weights, reflecting a desired degree of contribution of individual information sources, or inputs, and making recommendation using the model 124. In accordance with one or more embodiments, parameters may be adapted using user feedback, such as user events. An iterative learning and prediction process may run continuously to provide a never-ending learning of model 124. In each iteration, the latest user events, e.g., user clicks, user skips, etc., may be used to incrementally update the model 124. The updated model 124, which may be constantly and continuously updated, reflects user feedback, which provides an assurance in a level of quality and user satisfaction, which in turn yields more abundant and informative training events for refreshing the model 124.

In accordance with one or more embodiments, user click data may be provided as input to the model generation and may be used to determine a level of importance of each feature, e.g., which feature, or features, are considered important to the user, and such a determination may be used in training the model. The model 124 may be periodically updated using new information, which new information may include user click data identifying items clicked on, or selected, by the user. Other type of user feedback may include user purchases, etc. In accordance with one or more embodiments, input 104 to model learning 126 may represent a type, or types, of social network, social activity, etc. input. The social network input may comprise co-view, co-purchase, co-favorite or other interest correlation data.

A model trained using a multimodal model trainer may be used to generate a set of recommendations comprising one or more products; the model may also be used to rank the products in the recommendation set.

In the example shown in FIG. 1, model learning 126 generates the model 124, which may be one or more gradient boosted decision tree(s), and may be referred to as a regression model. It should be apparent that other types of models may be generated using model learning 126. In the example, a product is presented visually to a user in the form of an image. It should be apparent that a product presentation may be audible, visual or both, for example.

In accordance with one or more embodiments, model learning 126 uses product similarities, e.g., similarities identified using visual product features extracted from product images, to generate, or train, model 124. In the example, shown in FIG. 1, visual similarities may be identified between products using images 106 of the products, each image visually depicts a product. In accordance with one or more embodiments, multimodality model learning comprises multiple different types of model training data, including visual similarities, user interest correlations between products, metadata, etc. Metadata information may comprise product title, description, price, etc. information. User interest correlations between products may be based on user co-views, co-purchases, etc.

In accordance with one or more embodiments, model 124 may be used to identify a set of items, e.g., products, for recommendation to a user, and a ranking for the items in the set. In the example shown in FIG. 1, a recommendation comprising a set of one or more products, which may be ranked, may be output by model 124 and used to refresh web page 110. In the example of FIG. 1, web page 110 includes image 102 of a product as well as images 108 of other products. The product images 108 may comprise images of products belonging to the set of recommended products identified using model 124.

In accordance with one or more embodiments, model learning 126 may use a continuous learning approach to update the model 124. The continuous learning approach may be such that model learning 126 updates model 124 in response to receiving new input. The new input may comprise user feedback in the form of user product selection input. User product selection input may comprise user product selections, such as and without limitation product views, product purchases, etc. User feedback including user product selection, or non-selection, may be used as feedback to improve model 124. By way of some non-limiting examples, user feedback comprising user selection, or non-selection, of a product, or products, may be used to identify which type(s) of training data(s) is/are important, or not important, to the user(s). A weighting that is based on user feedback may be used to retrain the model 124. By way of a non-limiting example, a higher weighting may be associated with the type of training data, e.g., visual similarity, social activity, product metadata, etc., determined to be more important to the user.

In accordance with one or more embodiments, an object detection 120 may be used to identify visual features, or characteristics, of each product using an image of each product. By way of a non-limiting example, each image from images 106 may be input to object detection 120, which may be used to extract each product's image, and extract visual features of each product's image, which visual features may be used in determining visual similarities among the products depicted in the images 106.

In the example shown in FIG. 1, image 102 is input to object detection 120 to detect the object, e.g., the product which is a red blouse in the example. In accordance with one or more embodiments, object detection 120 may be used to differentiate the portion(s) of the image that depict(s) the product and any portion(s) of the image depicting something other than the product. In the example of image 102, object detection 120 may be used to ignore extraneous portions of the image, e.g., the background and the model modeling the blouse, and to locate and extract the portion of the image depicting the product, e.g., the red blouse. Extraneous image data may be identified and ignored so that the image of the product is extracted for use in determining visual product similarity 122 among the product images extracted from images 106.

In accordance with one or more embodiments, visual object detection 120 may comprise an intelligent product object extraction, which analyzes an image to determine an approach, or tool, to use to extract the product's image. Detection of the existence, or absence, of extraneous image data may be used in determining which extraction tool or process to use to extract a product's image.

By way of a non-limiting example, object detection 120 may determine whether or not image content includes an image of a model, and such a determination may be used to determine a type of extraction tool to use for extracting a product's image from image content. By way of a non-limiting example, a model detector, e.g., a human model detector, may be used to determine whether the image content includes an image of a human model, or parts thereof. Identification of a human model or parts thereof may be used to identify the portion of an image comprising a product's image. In the example of image 102 shown in FIG. 1, the identification of the human model's head, neck, hand, wrist, arm, etc. may be used in identifying the portion of the image depicting the red blouse. Additionally and if the model detector does not detect a model, or models, such information may be used to select another tool or extraction process, such as an edge-based background removal tool, to use in extracting a product's image.

Figure 2:
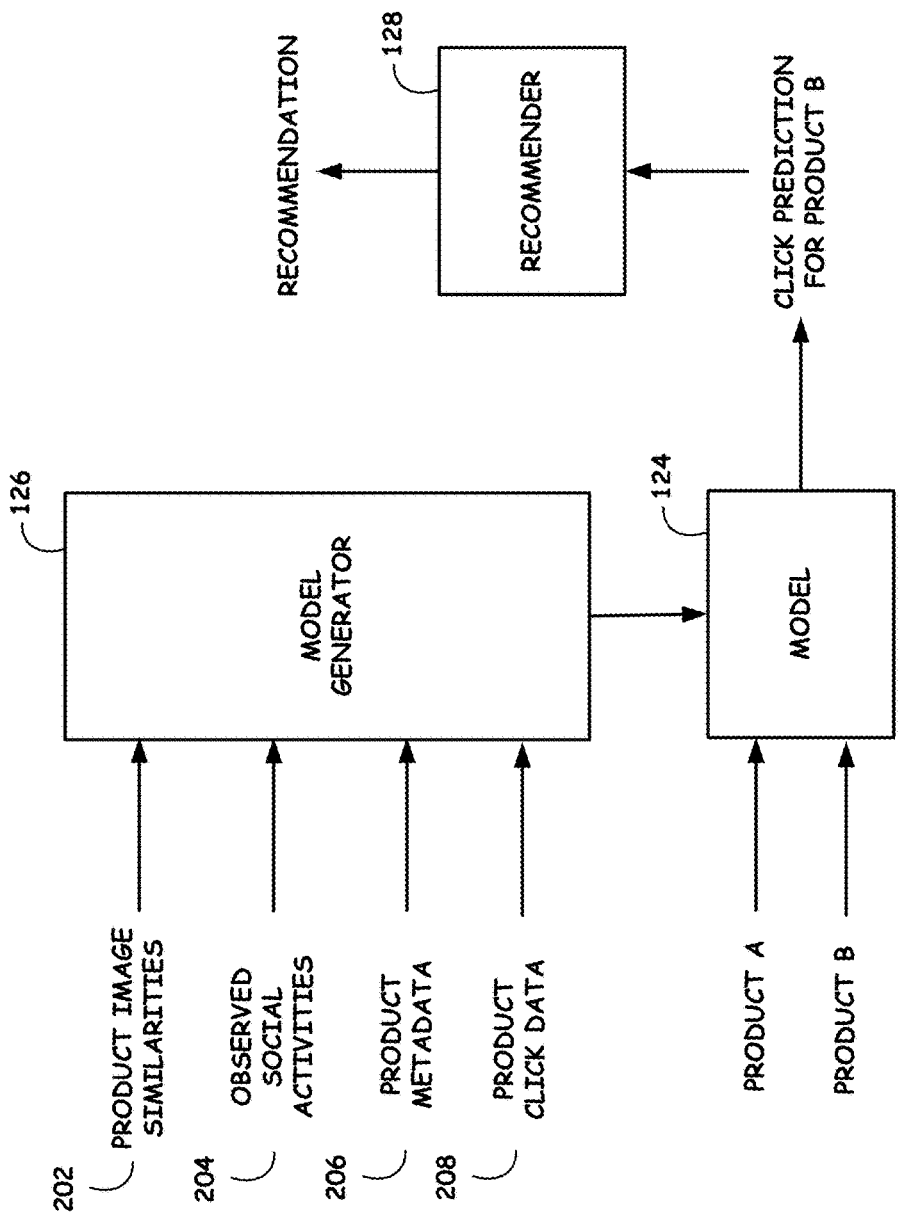

FIG. 2 illustrates components for use in accordance with one or more embodiments of the present disclosure. In accordance with one or more embodiments, the model generator 126 is configured to provide multimodality model learning, such that it uses multiple modes, or types, of training data to generate the model 124. In the example shown in FIG. 2, input such as product image similarities 202, observed social activities 204, product metadata 206 and product click data 208 may be input to model generator 126. Model generator 126 may train, or retrain, a model 124.

Model 124 may be used to make predictions, such as a click prediction. By way of a non-limiting example, and given a pairs of products, e.g., products A and B, and their features, e.g., visual, social, metadata, etc. features, may be input to model 124 to generate a click prediction, e.g., a probability, or likelihood, that a user might click on product B if it is presented in connection with product A in a set of recommended products for the user. The click prediction for a number of products may be input to recommender 128 and used by recommender 128 in identifying a set of product recommendations for presentation to a user. By way of a non-limiting example, a click prediction associated with product B, as well as click predictions for other products, may be used to determine which product(s) to include in a recommendation set to be presented when product A, e.g., the red blouse shown in FIG. 1, is presented to the user. Referring to FIG. 1, for example, model 124 may be used to identify the products presented in area 108 of web page 110.

By way of a non-limiting example, product similarities 202 may comprise a matrix of vectors, each vector corresponding to a product and comprising an indicator of the similarity between the product's visual features and each other product's visual features, and each product's visual features may be determined by analyzing an image of the product. By way of a further non-limiting example, the indicator of similarity, or visual similarity, may indicate a degree, or level, of visual similarity between two products. Observed social activities 204 may comprise, by way of a non-limiting example, information indicating, for a given product, each other product for which a shared user interest is identified from user behavior. Such shared user interest may be identified for those products that are co-viewed, co-purchased, etc. by one or more users. By way of a non-limiting example, observed social activities 204 may comprise a vector for a given product, which contains a value, such as a yes or no value, for each other product indicating whether the other product was viewed, purchased, etc. with the given product.

Model generator 126 may further use product metadata 206 associated with each product. By way of a non-limiting example, product metadata 206 for a given product may include information about the product, such as and without limitation product title, product description, product price, color, etc. Product click data 208 may comprise information identifying click data, e.g., a number of clicks, or user selections, associated with a given product.

In accordance with one or more embodiments, model generator 126 may be used to initially train model 124 as well as to retrain model 124. In accordance with one or more such embodiments, model 124 may be retrained on a continuous basis, or at least often enough to update model 124 based on information newly-received by the model generator 126. The newly-received information might be any one or more of the product similarities 202, observed social activities 204, product metadata 206 and product click data 208.

Figure 3:
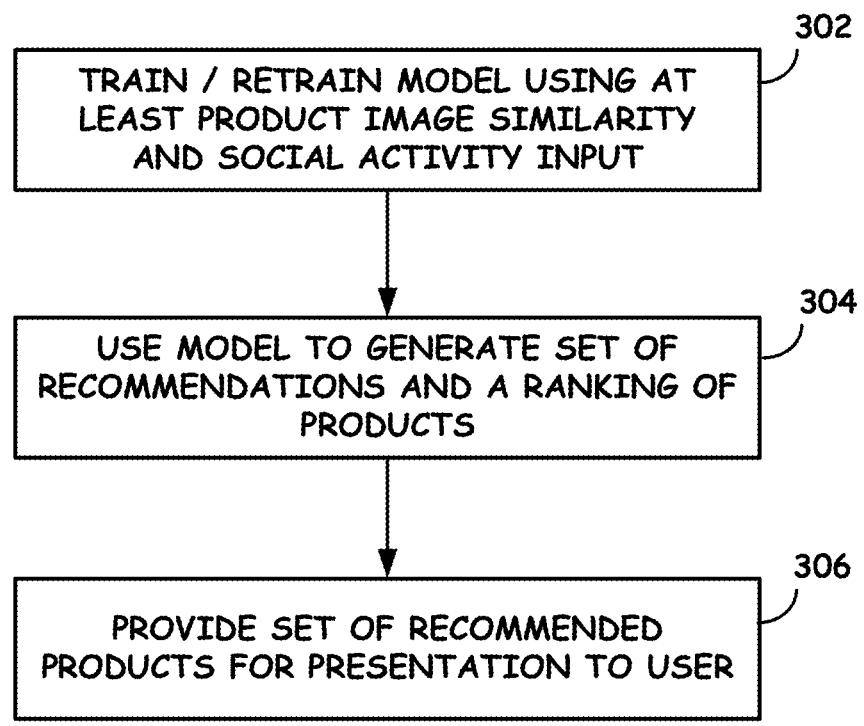

FIG. 3 provides a process flow example for use in accordance with one or more embodiments of the present disclosure. At step 302, a model, e.g., model 124, is trained, or retrained, using the information received by a model generator, e.g., model generator 126. In accordance with one or more embodiments, the model generator uses at least product image similarity and social activity information to generate the model.

At step 304, the model is used to generate a set of recommendations and a ranking of the recommendations. The recommendations may be, for example and without limitation, product recommendations. By way of a non-limiting example, the selection and/or ranking may be based on a click prediction value associated with each product, which click prediction value may be determined using model 124 and features, e.g., which may in the form of a feature vector, associated with each product. The set of recommendations may comprise one or more products selected from a corpus of products, and the selection may be based on each product's click prediction value relative to the click prediction values of other products in the corpus. By way of a non-limiting example, the click prediction values may be determined relative to a seed product, e.g., a product such as the red blouse shown in web page 110 of FIG. 1.

At step 306, the set of recommended products may be provided for presentation to the user. By way of a non-limiting example, the set of recommended products may be included in a web page, e.g., web page 110 of FIG. 1, as recommended products to be presented with the primary product displayed in the web page, e.g., the red blouse displayed in web page 110 of FIG. 1.

Figure 4:
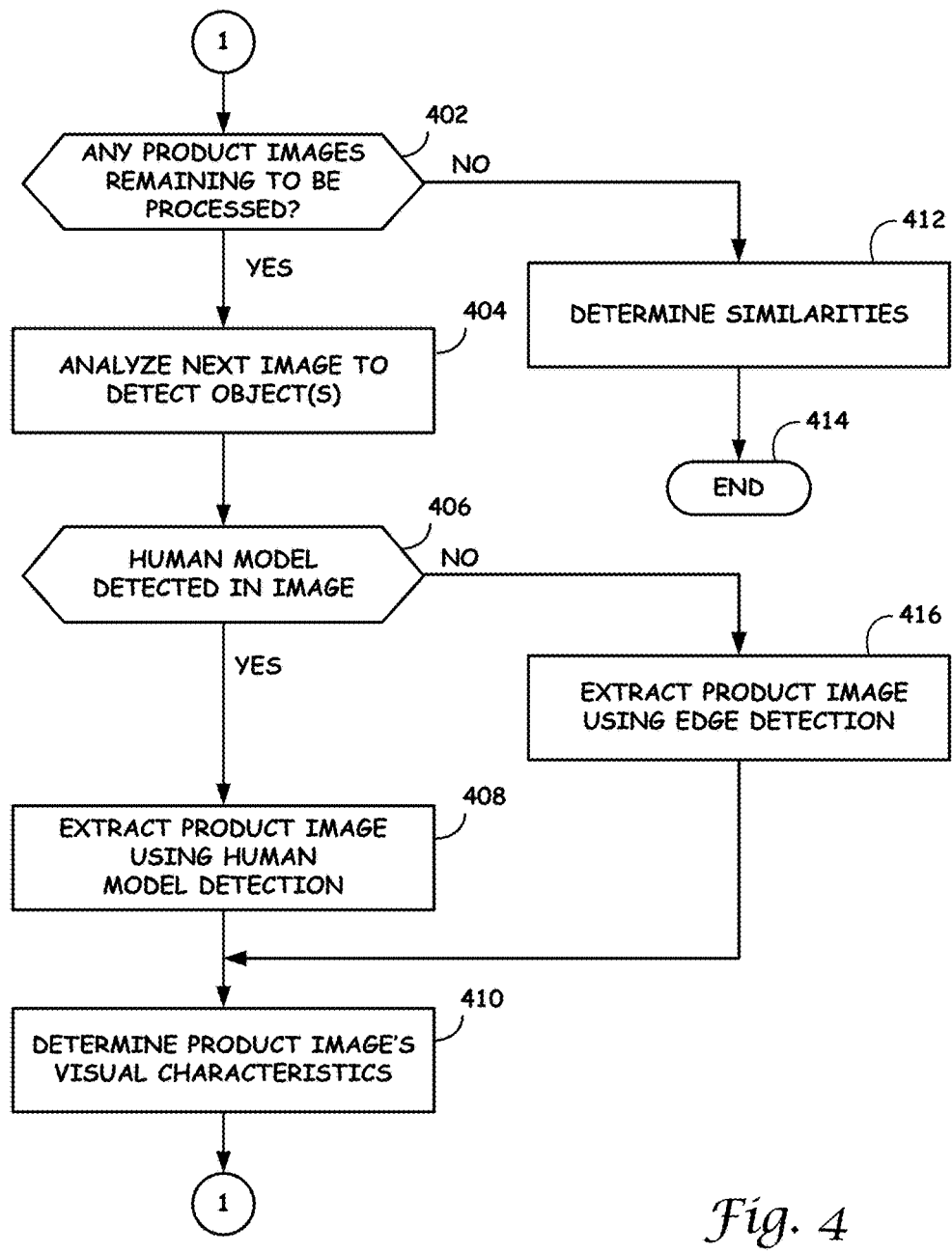

FIG. 4 illustrates another process flow example for use in accordance with one or more embodiments of the present disclosure. In accordance with one or more embodiments, the process shown in FIG. 4 might be performed in connection with training, or retraining, a model. At step 402, a determination is made whether any product images remain to be processed. If not processing continues at step 126 to determine similarities between the product images. By way of a non-limiting example, a similarity value measuring the similarity between each pair of product images may be determined at step 412. Processing ends for the current training set of product images at step 414. The process shown in FIG. 4 may be iteratively performed in response to additional, e.g., newly-received, product images, for example.

If it is determined, at step 402, that product images remain to be processed, processing continues at step 404 to analyze the next image to locate an image of a product. In accordance with one or more embodiments, an intelligent product object extraction process may be used. The intelligent product object extraction process may be used to classify a product image as belonging to one of two or more groups, e.g., a group in which a product is depicted with a human model or a group in which the image content depicts a product image without a human model and/or a complex background.

In accordance with at least one embodiment of the present disclosure, a cascade of detectors may be used to analyze image content and to extract a product's image from image content. By way of a non-limiting example, an object detector may be used to determine whether an object, e.g., a model such as and without limitation a human model, is depicted in the image of a product, and if such an object is found, the portion of the object that is depicted in the image may be located and used to locate and extract the product's image. In a case that model detection does not detect a model object, another detector, e.g., an edge-based object detector may be used to filter out the relevant background and acquire an image mask.

In accordance with one or more embodiments, an object detector may detect any type of object. In the example provided herein, an object detector might be used to detect a human model where the product is of a type that might be presented using a human model, e.g. such as clothing, accessories, etc. Such an object detector may comprise a human pose estimator to locate portions of the human model and extract the product content. By way of a non-limiting example, at least one deformable part-based model (DPM) may be used to detect a human model.

A DPM used in accordance with one or more embodiments of the present disclosure may comprise a set of parts filters, a set of deformations that provide geometric information regarding different parts, and a scoring function that provides the basis for combining the deformations and part-filter responses. By way of a further non-limiting example, to detect objects in an image, an overall score may be computed for each root location according to the best possible placement of the parts, which score, $s(I, p_0)$, may be determined using the following example:

$$s(I,p_0) = {}_{p_1 \ldots p_n}^{max} \Sigma_{i=0}^{n} m_i(I,p_i) - \Sigma_{i=1}^{n} d_i(p_0,p_i),$$

where I represents a feature pyramid, p represents the set of part filters, m( ) represents the filter scores, and d( ) represents spring costs. In accordance with one or more embodiments, a grabcut algorithm may be used to remove noise to improve accuracy in segmenting a region of the product in a product image. By way of a non-limiting example, the grabcut algorithm may be used to estimate a color distribution of a target object and background using a Gaussian mixture model.

Figure 5:
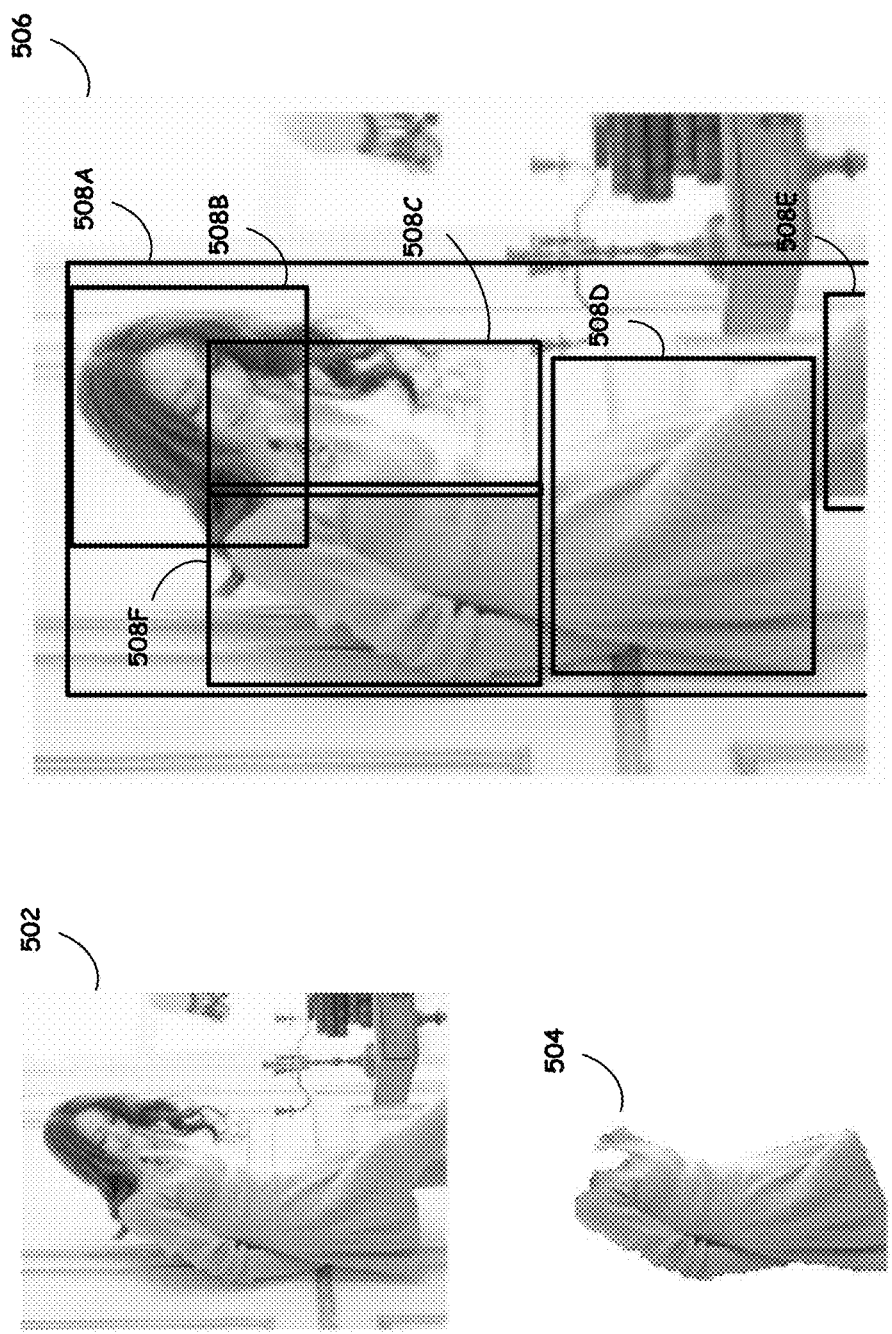

FIG. 5 provides an example of an extraction of a product from an image that includes a model in accordance with one or more embodiments of the present disclosure. Image 502 may be analyzed using one or more detectors to extract an image 504 of a product's object from the image 502. A human pose estimator comprising one or more filters of a DPM may be used to detect extraneous portions, e.g. parts of a human model, depicted in image 502 in order to remove irrelevant, extraneous content and identify the desired content, e.g., image content depicting a product. Image 506 is provided to illustrate a use of filters applied to regions 508 of the image.

In a case that model detection does not detect an extraneous object, or objects, another detector, e.g., an edge-based object detector may be used to filter out irrelevant, or extraneous image portions, such as background image portions, and acquire an image mask. Most images of products are typically primarily uniform in color, such that edges may be detected and such edges may be used to identify a contour of the product. By way of a non-limiting example, an image mask may be determined by detecting edges, which mask may be used as an indicator of the location of an image of product in image content.

Figure 6:
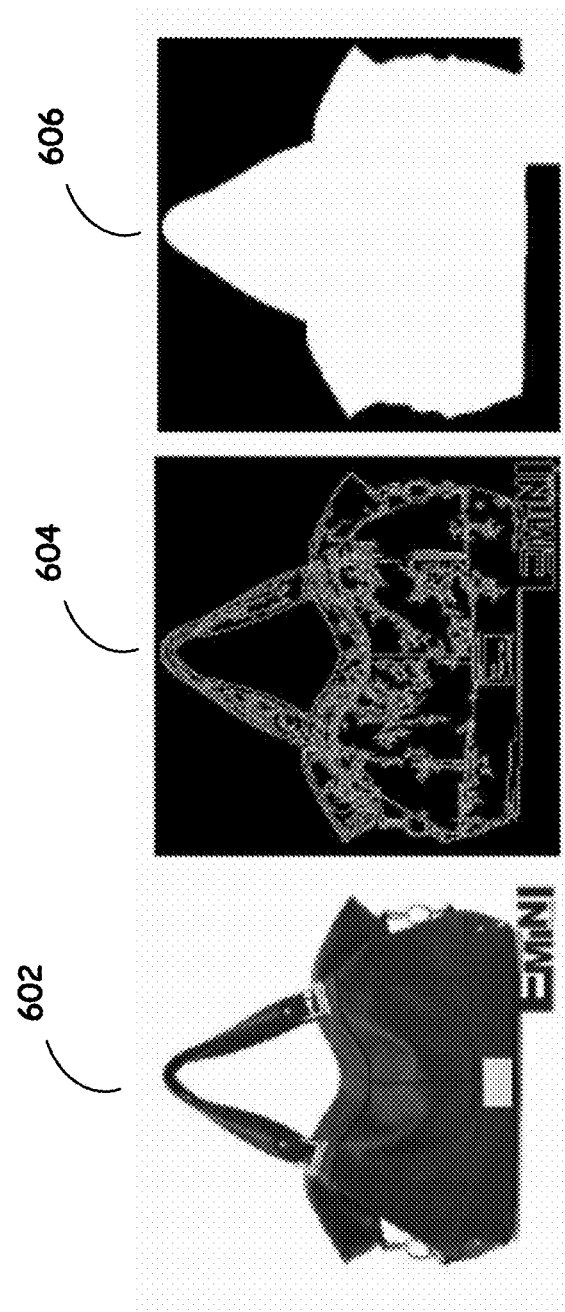

FIG. 6 provides an example of product image extraction using an image mask in accordance with one or more embodiments of the present disclosure. Image content 602 includes a product's image, e.g. an image of a handbag. One or more edge detectors, such as and without limitation Canny edge detector(s), may be used to detect edges in the image content 602. Such edges are shown in the example 604. Dilation may be used to close up any gaps in the outline. The edges may be used to determine an outline of an object, e.g., the handbag shown in the image content 602. An image mask such as that shown in the example 606 may be acquired using the outline determined from the detected edges. The image mask may be used to identify and locate the image of the product in the image content 602.

Returning to FIG. 4, visual similarity determined at step 412 may be determined using visual characteristics associated with each of one or more product's image(s). Such visual characteristics, or features, may include without limitation color, texture, shape, contour etc. By way of a non-limiting example, RGB color values associated with each of the pixels in the region of interest, e.g., the region depicting a product's image, may be converted to hue-saturation-value (HSV) color space, which color space may be separated into a number, such as and without limitation 30, color bins. Each pixel may be quantized based on this binning. By way of a further non-limiting example, texture may be expressed using such texture classifications as local binary pattern (LBP) and/or SIFT. Descriptors, e.g., HSV, LBP and SIFT descriptors, may be clustered to build a visual dictionary, and each descriptor may be mapped to form a visual word. By way of a non-limiting example, a product's image may be expressed as a set of words from a vocabulary of visual words. Features extracted from the product image(s) may be concatenated as I=[$w_1$, $w_2$, ..., $w_n$] to represent a product, where w denotes a visual word from either a color, LBP or SIFT descriptor.

Referring again to step 412 of FIG. 4, a level of similarity between a pair of product images may be determined, in accordance with one or more embodiments, using each product image's visual word representation, which representation may be determined using the image's visual characteristics. By way of a non-limiting example, given a collection T of product images, each image I in the collection may be represented as a discrete set of visual words. Assume that a database image $I_i$ is obtained as a sample from a unigram language model, such as and without limitation a multinomial word distribution, represented as $P(w|\theta_{I_i})$ with parameters, $\theta_{I_i}$, where $P(w|\theta_{I_i})$ represents a probability of a word w given the model parameters $\theta_{I_i}$. The unigram language model may be estimated by treating the image as a sample from an underlying multinomial word distribution and using a maximum likelihood estimator, which may be expressed as follows:

$$P(w|\hat{\theta}_{I_i}) = \frac{tf(w, I_i)}{|I_i|},$$

where $tf(w, I_i)$ represents a count of the visual word w in the image $I_i$, and $|I_i|$ represents the total number of visual words in the image $I_i$. In accordance with one or more embodiments, a degree of similarity between two images may be expressed using a relevance value determined for the two images using each image's estimated language model. In accordance with one or more such embodiments, such a relevance value may be measured using Kullback-Leibler divergence, which may also be referred to as KL-divergence or KLD.

By way of a non-limiting example, given estimated language models for two products, which models may be represented as $\hat{\theta}_{I_Q}$ and $\hat{\theta}_{I_i}$, a degree of similarity may be expressed as a relevance value of one database image $I_i$ with respect to a second database image $I_Q$, which second database image may be considered to be a query image. Such a relevance value may be determined, in accordance with one or more embodiments, as a KL-divergence measure, which may be determined as illustrated in the following example:

$$KLD(\hat{\theta}_{I_Q}||\hat{\theta}_{I_i}) = \sum_{w \in V} P(w|\hat{\theta}_{I_Q}) \log \frac{P(w|\hat{\theta}_{I_Q})}{P(w|\hat{\theta}_{I_i})},$$

where V is the set of all visual words.

Referring again to step 304 of FIG. 3, a recommender may recommend a number of products identified using a seed product. With reference to FIG. 1, the red blouse displayed on the web page 110 might be used as a seed product image to identify one or more products whose images 108 may be displayed as recommended products in the web page 110 with the red blouse.

Initially, a traditional collaborative filtering method might be used initially to identify product recommendations based on social activity input, e.g., co-view, co-purchase, etc.; however, model 124 may be used to generate a set of recommendations that may be based on the multimodal learning performed by learner, or model generator, 126, which blends the social activity of users with visual similarities among products to train a model, e.g., model 124. Feedback from the user, e.g., user click data may also be used to provide further guidance in training the model 124. By way of a non-limiting example, user feedback may be used to emphasize one or more types of training data to train, or retrain, model 124. By way of a further non-limiting example, user feedback may be used to determine that visual characteristics of products are more or less important than product metadata, social activity information, etc. User feedback may be used by model generator 126 in weighting the various types of training data to generate the model 124. User feedback may be observed, or implicit, such as is the case with user click data. Other examples of user feedback data include explicit user feedback data. By way of a non-limiting example, each of one or more users may be presented with a set of recommendations and requested to indicate which one(s) from the set the user(s) consider(s) to be more interesting to the user(s).

By way of a further non-limiting example, a user may be asked to highlight, e.g., using a drawing rectangle, each image, or portion of an image, of each product that the user considers interesting. Such explicit user input may be referred to as hint input. In accordance with one or more such embodiments, a feedback model, which may be represented as $P(w|\hat{\theta}_F)$, may be used to generate a new model 124, which may be represented as $P(w|\hat{\theta}_{I_Q}^{NEW})$. By way of a non-limiting example, the new model generation may be expressed as follows:

$$P(w|\hat{\theta}_{I_Q}^{NEW})=\psi P(w|\hat{\theta}_{I_Q})+(1-\psi)P(w|\hat{\theta}_F).$$

In accordance with one or more embodiments, an expectation-maximization, EM, approach may be used in to learn the feedback model, $P(w|\hat{\theta}_F)$. In the following non-limiting example, the feedback model may be learned using hint input provided by the user, which input is represented as R. An EM s that may be used to learn the feedback model may be expressed as follows:

$$\hat{\theta}_F^{EM}=\operatorname{argmax}_{\theta_F} \log P(R|\hat{\theta}_F).$$

In accordance with one or more embodiments, EM updates for $P(w|\hat{\theta}_F)$ may be expressed as follows:

$$h^{(n)}(w) = \frac{(1-\beta)P_\beta(w|\theta_F)}{(1-\beta)p_\beta(w|\theta_F) + \beta_p(w|\theta_B)}, \text{ and}$$

$$p^{n+1}(w|\theta_F) = \frac{\sum_{I \in R} tf(w, I) h^n(w)}{\sum_{w_i \in V} \sum_{I \in R} tf(w_i, I) h^{(n)}(w_i)}.$$

Figure 7:

FIG. 7 provides examples of product recommendations identified for a given product, a seed product. Each seed object 702 may be used to identifying one or more visually similar products 704, which may be identified using a learned model, e.g., model 124.

Figure 8:
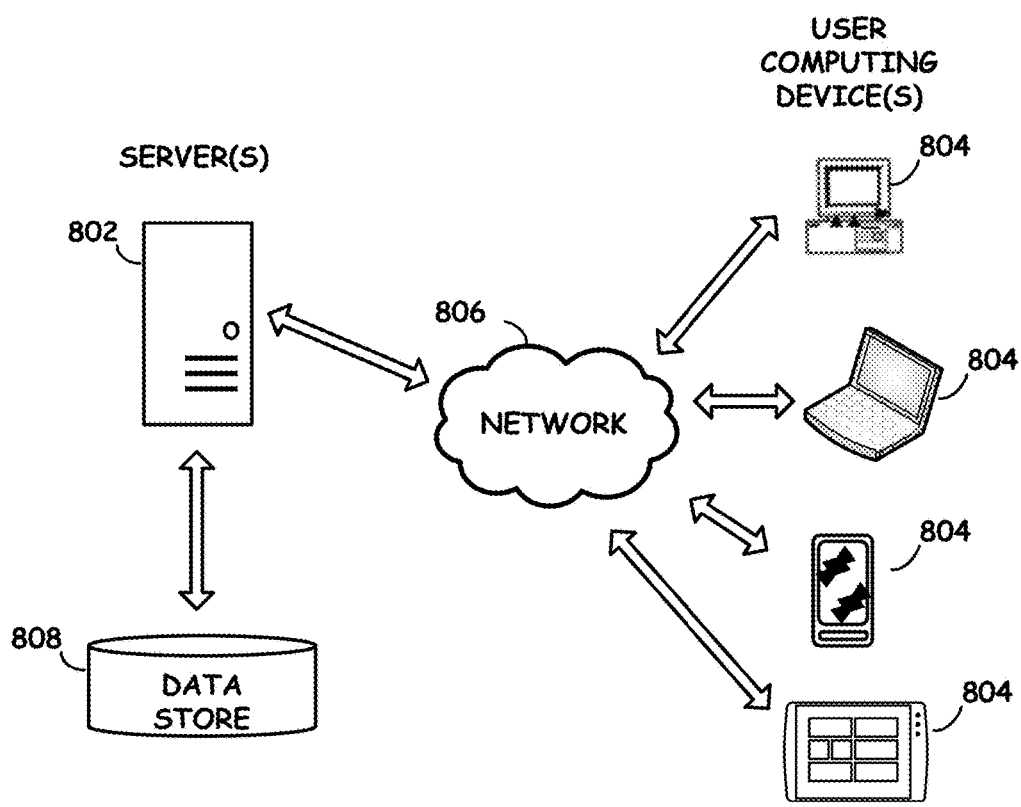
FIG. 8 illustrates some components that can be used in connection with one or more embodiments of the present disclosure.

FIG. 8 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, one or more instances of computing device 802 can be configured to execute program code, instructions, etc. to provide functionality in accordance with one or more embodiments of the present disclosure. By way of a further non-limiting example, the computing device 802 and/or user computing device 804 may be configured to implement the process flows discussed herein and shown in FIGS. 3 and 4. As yet a further non-limiting example, one or more instance of computing device 802 and/or computing device 804 may be configured to perform object detection 120, visual similarity determination 122, model learning 126, recommender 128, etc.

Computing device 802 may serve content for presentation using user computing devices 804 using a browser application via a network 806, for example. Data store 808 can be used to store program code to configure a server 802 to functionality in accordance with one or more embodiments of the present disclosure.

The user computing device 804 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 802 and the user computing device 804 can include one or more processors, memory, a removable media reader, network interface, display and interface, and one or more input devices, e.g., keyboard, keypad, mouse, etc. and input device interface, for example. One skilled in the art will recognize that server 802 and user computing device 804 may be configured in many different ways and implemented using many different combinations of hardware, software, or firmware.

In accordance with one or more embodiments, a computing device 802 can make a user interface available to a user computing device 804 via the network 806. The user interface made available to the user computing device 804 can include content items, or identifiers (e.g., URLs) selected for the user interface in accordance with one or more embodiments of the present invention. In accordance with one or more embodiments, computing device 802 makes a user interface available to a user computing device 804 by communicating a definition of the user interface to the user computing device 804 via the network 806. The user interface definition can be specified using any of a number of languages, including without limitation a markup language such as Hypertext Markup Language, scripts, applets and the like. The user interface definition can be processed by an application executing on the user computing device 804, such as a browser application, to output the user interface on a display coupled, e.g., a display directly or indirectly connected, to the user computing device 804.

In an embodiment the network 806 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 8. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 9:
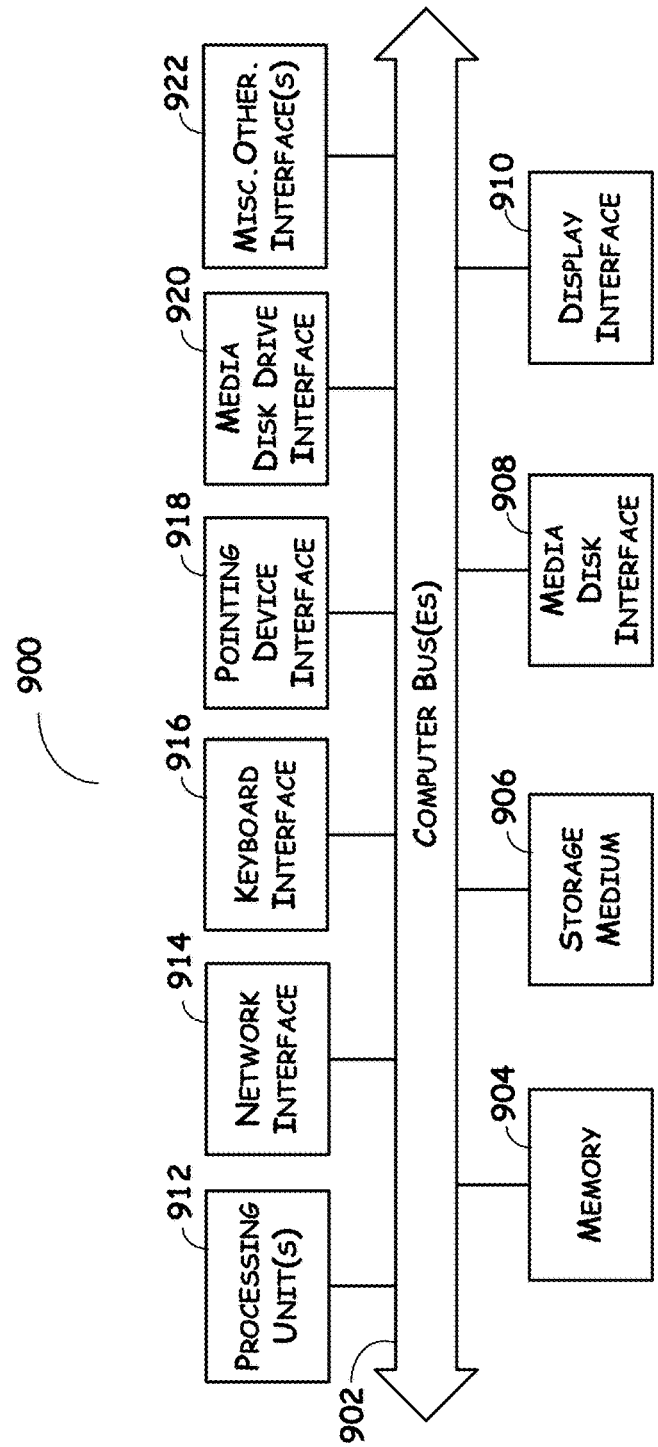
FIG. 9 is a detailed block diagram illustrating an internal architecture of a computing device in accordance with one or more embodiments of the present disclosure.

FIG. 9 is a detailed block diagram illustrating an internal architecture of a computing device, e.g., a computing device such as server 802 or user computing device 804, in accordance with one or more embodiments of the present disclosure. As shown in FIG. 9, internal architecture 900 includes one or more processing units, processors, or processing cores, (also referred to herein as CPUs) 912, which interface with at least one computer bus 902. Also interfacing with computer bus 902 are computer-readable medium, or media, 906, network interface 914, memory 904, e.g., random access memory (RAM), run-time transient memory, read only memory (ROM), etc., media disk drive interface 920 as an interface for a drive that can read and/or write to media including removable media such as floppy, CD-ROM, DVD, etc. media, display interface 910 as interface for a monitor or other display device, keyboard interface 916 as interface for a keyboard, pointing device interface 918 as an interface for a mouse or other pointing device, and miscellaneous other interfaces not shown individually, such as parallel and serial port interfaces, a universal serial bus (USB) interface, and the like.

Memory 904 interfaces with computer bus 902 so as to provide information stored in memory 904 to CPU 912 during execution of software programs such as an operating system, application programs, device drivers, and software modules that comprise program code, and/or computer-executable process steps, incorporating functionality described herein, e.g., one or more of process flows described herein. CPU 912 first loads computer-executable process steps from storage, e.g., memory 904, computer-readable storage medium/media 906, removable media drive, and/or other storage device. CPU 912 can then execute the stored process steps in order to execute the loaded computer-executable process steps. Stored data, e.g., data stored by a storage device, can be accessed by CPU 912 during the execution of computer-executable process steps.

Persistent storage, e.g., medium/media 906, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:

analyzing, by an item recommendation system server and using at least one object detector, image content of a plurality of images to detect objects depicting a plurality of items, the analyzing comprising extracting visual characteristics from each item's image content determining, by the item recommendation system server, visual similarity training data for the plurality of items, the visual similarity training data identifying, for each pair of items of the plurality of items, a level of visual similarity between image content depicting, as the objects of the image content, the items in the pair;

determining, by the item recommendation system server, social activity training data for the plurality of items, the social activity training data identifying, for each pair of items of the plurality of items, an indicator of whether a shared user interest in the pair of items exists, an existing shared user interest indicating that at least one user has shown an interest in both items in the pair;

generating, by the item recommendation system server, training data comprising a vector matrix, the vector matrix comprising:

a feature vector for each item of the plurality of items, the feature vector for an item of the plurality of items comprising:

a plurality of level of visual similarity indicators and a plurality of shared user interest indicators, each level of visual similarity indicator indicating a determined level of visual similarity between the item and another item of the plurality of items; and each indicator of shared user interest indicating whether a shared interest exists between the item and another item of the plurality of items;

generating, by the item recommendation system server, a machine-trained model using machine learning and the training data comprising the vector matrix comprising the feature vector generated for each item of the plurality of items;

generating, by the item recommendation system server, a set of recommended items, the generating comprising using the generated machine-trained model in identifying a number of items, of the plurality of items, having similar visual features for inclusion in the set of recommended items; and communicating, by the item recommendation system server to a client computing device of a user over an electronic communications network, the image content depicting each item of the set of recommended items, identified using the generated machine-trained model, for display at the client computing device.

2. The method of claim 1, determining social activity training data further comprising determining the social training data using observed behavior of the at least one user, the observed user behavior comprising one or more of a co-view, co-purchase and co-favorite observed user behavior of both items.

3. The method of claim 1, the extracting visual characteristics from each item's image content further comprising:

making a determination, using the at least one object detector, whether the item's image content contains one or more extraneous objects other than the item; and selecting an extraction tool based on the determination.

4. The method of claim 3, the selecting further comprising:

selecting an edge-based background removal extraction tool if the determination indicates an absence of the one or more extraneous objects; and selecting a deformable part-based model to extract the item's image content if the determination indicates a presence of one or more extraneous objects.

5. The method of claim 1, further comprising:

receiving, by the item recommendation system server, user feedback comprising information identifying user item selection; and retraining, by the item recommendation system server, the model using the training data comprising the visual similarity training data and the social activity training data and the user feedback, the retraining comprising identifying, using the user feedback, a weighting for at least the visual similarity training data and the social activity training data to be used in retraining the model.

6. The method of claim 5, the training data further comprising item metadata.

7. The method of claim 1, generating a set of recommended items using the trained model further comprising:

determining, using the trained model, a click prediction for each of the items of the plurality, each item's click prediction is based at least on the item's features, the item's features comprising at least visual similarity and social activity features; and selecting one or more items of the plurality based on each item's click prediction.

8. An item recommendation system server comprising:

a processor;

a storage medium for tangibly storing thereon program logic for execution by the processor, the stored program logic comprising:

analyzing logic executed by the processor for analyzing, using at least one object detector, image content of a plurality of images to detect objects depicting a plurality of items, the analyzing comprising extracting visual characteristics from each item's image content;

first determining logic executed by the processor for determining visual similarity training data for a plurality of items, the visual similarity training data identifying, for each pair of items of the plurality of items, a level of visual similarity between image content depicting, as the objects of the image content, images of the items in the pair;

second determining logic executed by the processor for determining social activity training data for the plurality of items, the social activity training data identifying, for each pair of items of the plurality of items, an indicator of whether a shared user interest in the pair of items exists, an existing shared user interest indicating that at least one user has shown an interest in both items in the pair;

generating logic executed by the processor for generating training data comprising a vector matrix, the vector matrix comprising:

a feature vector for each item of the plurality of items, the feature vector generated for an item of the plurality of items comprising:

a plurality of level of visual similarity indicators and a plurality of shared user interest indicators, each level of visual similarity indicator indicating a determined level of visual similarity between the item and another item of the plurality of items; and each indicator of shared user interest indicating whether a shared interest exists between the item and another item of the plurality of items;

generating logic executed by the processor for generating a machine-trained model using machine learning and training data comprising the vector matrix comprising the feature vector generated for each item of the plurality of items;

generating logic executed by the processor for generating, a set of recommendations, the generating using the generated machine-trained model in identifying a number of items, of the plurality of items, having similar visual features for inclusion in the set of recommended items; and communicating logic executed by the processor for communicating, to a client computing device of a user over an electronic communications network, the image content depicting each item of the set of recommended items, identified using the generated machine-trained model, for display at the client computing device.

9. The item recommendation system server of claim 8, the second determining logic executed by the processor for determining social activity training data further comprising determining logic executed by the processor for determining the social training data using observed behavior of the at least one user, the observed user behavior comprising one or more of a co-view, co-purchase and co-favorite observed user behavior of both items.

10. The item recommendation system server of claim 8, the extracting logic executed by the processor for extracting visual characteristics from each item's image content further comprising:

determining logic executed by the processor for making a determination, using the at least one object detector, whether the item's image content contains one or more extraneous objects other than the item; and selecting logic executed by the processor for selecting an extraction tool based on the determination.

11. The item recommendation system server of claim 10, the selecting logic further comprising:

first selecting logic executed by the processor for selecting an edge-based background removal extraction tool if the determination indicates an absence of the one or more extraneous objects; and second selecting logic executed by the processor for selecting a deformable part-based model to extract the item's image content if the determination indicates a presence of one or more extraneous objects.

12. The item recommendation system server of claim 8, the stored program logic further comprising:

receiving logic executed by the processor for receiving user feedback comprising information identifying user item selection; and retraining logic executed by the processor for retraining the model using the training data comprising the visual similarity training data and the social activity training data and the user feedback, the retraining logic comprising identifying logic executed by the processor for identifying, using the user feedback, a weighting for at least the visual similarity training data and the social activity training data to be used in retraining the model.

13. The item recommendation system server of claim 12, the training data further comprising item metadata.

14. The item recommendation system server of claim 8, the generating logic for generating a set of recommended items using the trained model further comprising:

determining logic executed by the processor for determining, using the trained model, a click prediction for each of the items of the plurality, each item's click prediction is based at least on the item's features, the item's features comprising at least visual similarity and social activity features; and selecting logic executed by the processor for selecting one or more items of the plurality based on each item's click prediction.

15. A computer readable non-transitory storage medium for tangibly storing thereon computer readable instructions that when executed by an item recommendation system server, perform a method comprising:

analyzing, using at least one object detector, image content of a plurality of images to detect objects depicting a plurality of items, the analyzing comprising extracting visual characteristics from each item's image content;

determining visual similarity training data for a plurality of items, the visual similarity training data identifying, for each pair of items of the plurality of items, a level of visual similarity between image content depicting, as objects of the image content, the items in the pair;

determining social activity training data for the plurality of items, the social activity training data identifying, for each pair of items of the plurality of items, an indicator of whether a shared user interest in the pair of items exists, an existing shared user interest indicating that at least one user has shown an interest in both items in the pair;

generating training data comprising a vector matrix, the vector matrix comprising:

a feature vector for each item of the plurality of items, the feature vector generated for an item of the plurality of items comprising:

a plurality of level of visual similarity indicators and a plurality of shared user interest indicators, each level of visual similarity indicator indicating a determined level of visual similarity between the item and another item of the plurality of items; and each indicator of shared user interest indicating whether a shared interest exists between the item and another item of the plurality of items;

generating a machine-trained model using machine learning and the training data comprising the vector matrix comprising the feature vector generated for each item of the plurality of items;

generating a set of recommended items, the generating comprising using the generated machine-trained model in identifying a number of items, of the plurality of items, having similar visual features for inclusion in the set of recommended items; and communicating, to a client computing device of a user over an electronic communications network, the image content depicting each item of the set of recommended items, identified using the generated machine-trained model, for display at the client computing device.

16. The computer readable non-transitory storage medium of claim 15, determining social activity training data further comprising determining the social training data using observed behavior of the at least one user, the observed user behavior comprising one or more of a co-view, co-purchase and co-favorite observed user behavior of both items.

17. The computer readable non-transitory storage medium of claim 15,
the extracting visual characteristics from each item's image content, comprising:
making a determination whether the item's image content contains one or more extraneous objects other than the item; and
selecting an extraction tool based on the determination.

18. The computer readable non-transitory storage medium of claim 17, selecting further comprising:
selecting an edge-based background removal extraction tool if the determination indicates an absence of the one or more extraneous objects; and
selecting a deformable part-based model to extract the item's image content if the determination indicates a presence of one or more extraneous objects.

19. The computer readable non-transitory storage medium of claim 15, further comprising:
receiving user feedback comprising information identifying user item selection; and
retraining the model using the training data comprising the visual similarity training data and the social activity training data and the user feedback, the retraining comprising identifying, using the user feedback, a weighting for at least the visual similarity training data and the social activity training data to be used in retraining the model.

20. The computer readable non-transitory storage medium of claim 19, the training data further comprising item metadata.

21. The computer readable non-transitory storage medium of claim 15, generating a set of recommended items using the trained model further comprising:
determining, using the trained model, a click prediction for each of the items of the plurality, each item's click prediction is based at least on the item's features, the item's features comprising at least visual similarity and social activity features; and
selecting one or more items of the plurality based on each item's click prediction.

* * * * *